(12) United States Patent
Mutsuno et al.

(10) Patent No.: US 11,792,344 B2
(45) Date of Patent: Oct. 17, 2023

(54) PRINTING SYSTEM, SHEET PROCESSING APPARATUS, PRINTING SYSTEM CONTROL METHOD, AND STORAGE MEDIUM FOR SHEET DETECTION AND SHEET PROCESSING

(71) Applicant: CANON KABUSHIKI KAISHA, Tokyo (JP)

(72) Inventors: Masahiro Mutsuno, Tokyo (JP); Masaki Kashiwagi, Hiratsuka (JP); Akinori Takeo, Yokohama (JP); Satoshi Totsuka, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/675,941

(22) Filed: Feb. 18, 2022

(65) Prior Publication Data

US 2022/0174165 A1 Jun. 2, 2022

Related U.S. Application Data

(60) Division of application No. 17/140,728, filed on Jan. 4, 2021, now abandoned, which is a continuation of application No. 15/928,663, filed on Mar. 22, 2018, now Pat. No. 10,911,626, which is a continuation of application No. 14/977,241, filed on Dec. 21, 2015, now Pat. No. 9,955,030.

(30) Foreign Application Priority Data

Dec. 25, 2014 (JP) .................................. 2014-263178

(51) Int. Cl.
*H04N 1/00* (2006.01)
*G03G 15/00* (2006.01)

(52) U.S. Cl.
CPC ..... *H04N 1/00777* (2013.01); *G03G 15/6541* (2013.01); *G03G 15/6582* (2013.01); *G03G 15/6591* (2013.01); *H04N 1/0032* (2013.01); *H04N 1/00639* (2013.01); *H04N 1/00689* (2013.01); *H04N 1/00795* (2013.01); *G03G 2215/00827* (2013.01)

(58) Field of Classification Search
CPC .................................................. H04N 1/00777
USPC ......................................................... 358/1.14
See application file for complete search history.

(56) References Cited

U.S. PATENT DOCUMENTS

| | | | | |
|---|---|---|---|---|
| 5,229,812 A * | 7/1993 | Toyama | .................... | B42C 1/12 270/58.08 |
| 5,697,039 A * | 12/1997 | Nishimori | .......... | G03G 15/6541 399/410 |
| 2004/0126122 A1* | 7/2004 | Kanamoto | ........... | H04N 1/2175 399/20 |
| 2011/0033218 A1 | 2/2011 | Sasahara | | |
| 2011/0042881 A1* | 2/2011 | Mano | ..................... | B65H 31/10 271/145 |

* cited by examiner

*Primary Examiner* — Jacky X Zheng
(74) *Attorney, Agent, or Firm* — Canon U.S.A., Inc. IP Division

(57) ABSTRACT

A printing system includes a printing apparatus that prints an image on a sheet, a sheet processer that executes sheet processing, and a sheet detection sensor that detects a sheet on which the sheet processing is performed not in association with the printing of an image, where the printing of an image is restricted in response to detection of a sheet by the sheet detection sensor.

13 Claims, 11 Drawing Sheets

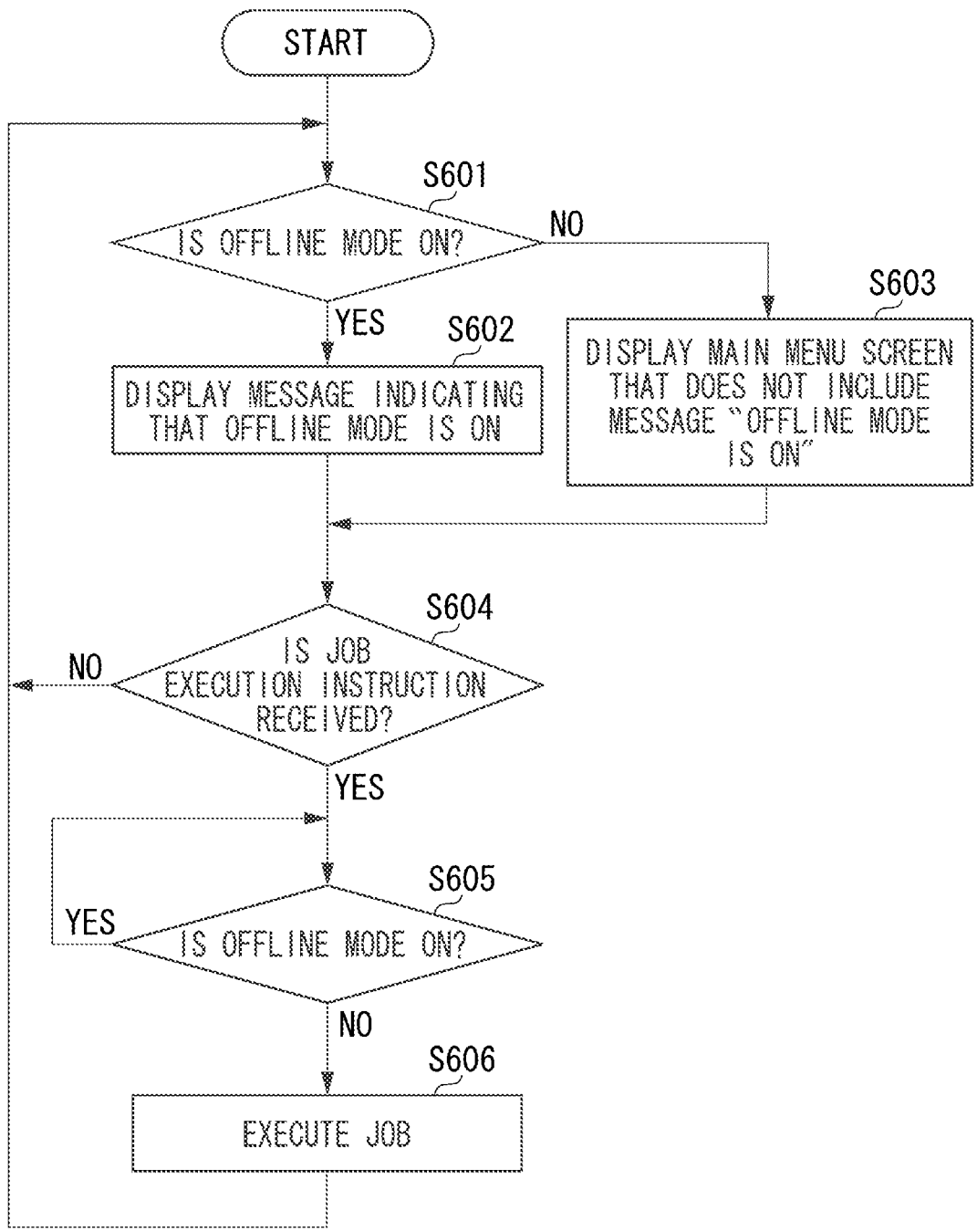

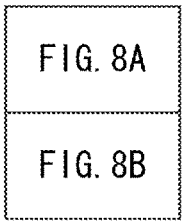
FIG. 8A
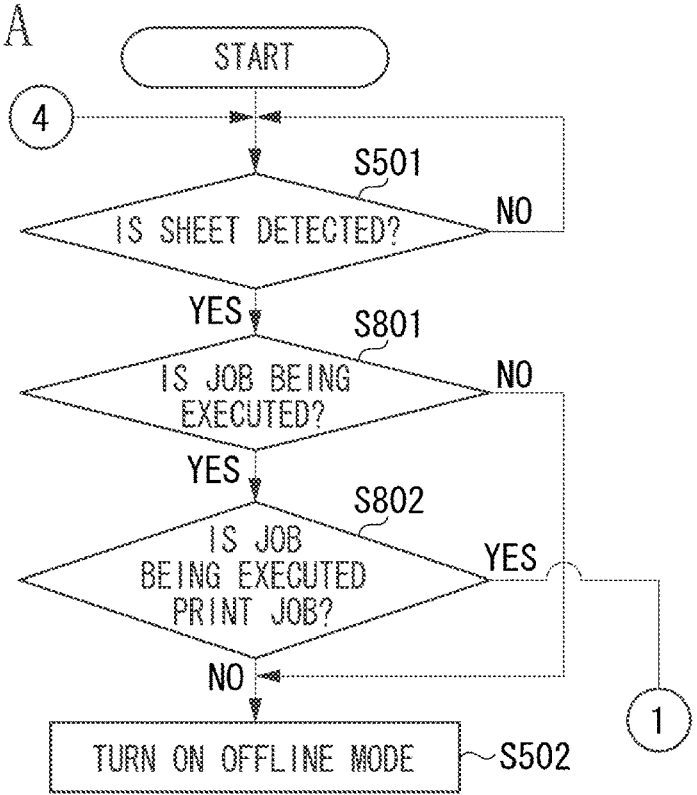
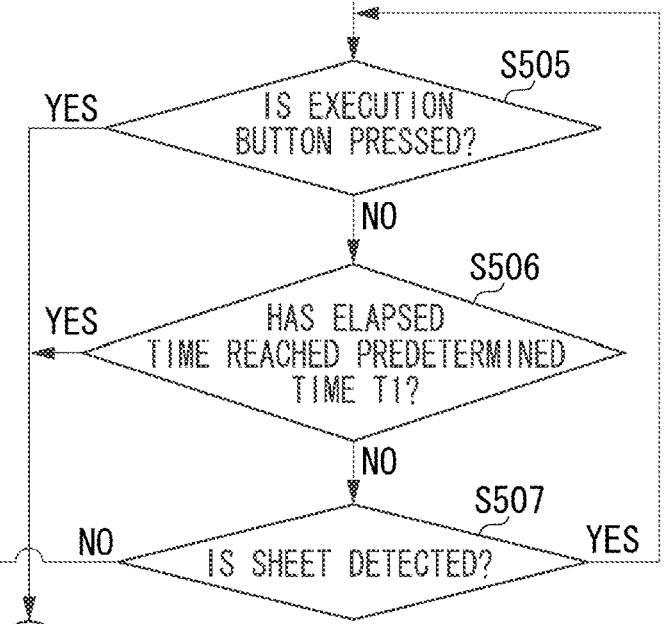

PRINTING SYSTEM, SHEET PROCESSING APPARATUS, PRINTING SYSTEM CONTROL METHOD, AND STORAGE MEDIUM FOR SHEET DETECTION AND SHEET PROCESSING

CROSS-REFERENCE TO RELATED APPLICATIONS

This application is a Division of U.S. patent application Ser. No. 17/140,728, filed Jan. 4, 2021, which is a Continuation of U.S. patent application Ser. No. 15/928,663, filed Mar. 22, 2018, now U.S. Pat. No. 10,911,626, which is a Continuation of U.S. patent application Ser. No. 14/977,241, filed Dec. 21, 2015, now U.S. Pat. No. 9,955,030, which claims the benefit of Japanese Patent Application No. 2014-263178, filed Dec. 25, 2014, all of which are hereby incorporated by reference herein in their entirety.

BACKGROUND

Field

Aspects of the present invention generally relate to a printing system that performs processing on a sheet.

Description of the Related Art

Conventionally, sheet processing apparatuses configured to perform processing on a sheet are known. Specific examples of known processing performed on a sheet include binding processing (stapling) for binding a plurality of sheets together with a staple, stapleless binding processing for binding a plurality of sheets together by swaging the sheets without a staple, punching processing for punching a sheet, etc. The foregoing processing will be referred to as "sheet processing."

One example of the sheet processing apparatuses is a sheet processing apparatus that is connected to a printing apparatus configured to print an image on a sheet when the sheet processing apparatus is used. In the case where the sheet processing apparatus and the printing apparatus are connected to each other, the sheet processing apparatus is connected on the downstream side of the printing apparatus in a direction in which a sheet is conveyed. The sheet processing apparatus receives from the printing apparatus a sheet on which an image is printed, and performs sheet processing on the sheet.

Further, there is known a sheet processing apparatus capable of performing sheet processing not in association with the printing of an image by a printing apparatus as well as performing sheet processing in association with the printing of an image by the printing apparatus. Japanese Patent Application Laid-Open Nos. 2014-162590, 2011-003005, and 2006-264978 each discuss a printing system that includes both a function to perform sheet processing in association with the printing of an image by a printing apparatus and a function to perform sheet processing not in association with the printing of an image by the printing apparatus.

In a sheet processing apparatus connected to a printing apparatus, when sheet processing is to be performed on a sheet set directly on the sheet processing apparatus by a user, there may be a conflict between the sheet processing and the conveyance of a sheet from the printing apparatus. More specifically, when the sheet processing is to be performed on the sheet set directly on the sheet processing apparatus by the user, if a printed sheet is conveyed from the printing apparatus, the operation of the user may be disturbed. Further, the sheet set directly on the sheet processing apparatus by the user may collide with a sheet conveyed from the printing apparatus to cause a jam error.

The foregoing are not considered in Japanese Patent Application Laid-Open Nos. 2014-162590 and 2011-003005. On the other hand, Japanese Patent Application Laid-Open No. 2006-264978 discusses an apparatus including a first conveying path used when post-processing is performed and a second conveying path used when the post-processing is not performed, in which when a manual mode for performing the post-processing not in association with the printing of an image is set, the conveyance of a sheet to the first conveying path is restricted.

According to Japanese Patent Application Laid-Open No. 2006-264978, however, the change to the manual mode is executed at the press of a start switch by a user. Thus, the press of the start switch is required to execute sheet processing on a sheet set directly on a sheet processing apparatus by the user, which is inconvenient for the user.

SUMMARY

Aspects of the present invention are directed to a printing system, a printing system control method, and a storage medium that restrict the printing of an image without requiring a user to perform a complicated operation when sheet processing is performed not in association with the printing of an image.

According to an aspect of the present invention, a printing system includes a printing unit configured to print an image on a sheet, a sheet processing unit configured to execute sheet processing, a detection unit configured to detect a sheet on which the sheet processing is executed by the sheet processing unit not in association with printing of an image by the printing unit, and a control unit configured to restrict the printing of an image by the printing unit in response to detection of a sheet by the detection unit.

Further features of the present disclosure will become apparent from the following description of exemplary embodiments with reference to the attached drawings.

BRIEF DESCRIPTION OF THE DRAWINGS

FIG. 6 is a flow chart illustrating operations of a printing apparatus according to an exemplary embodiment.

DESCRIPTION OF THE EMBODIMENTS

Various exemplary embodiments of the present invention will be described in detail below with reference to the drawings. Aspects of the present invention are not limited to the disclosed exemplary embodiments and not all the combinations of features described in the exemplary embodiments are always essential to a technical solution provided by aspects of the present invention.

Figure 1:
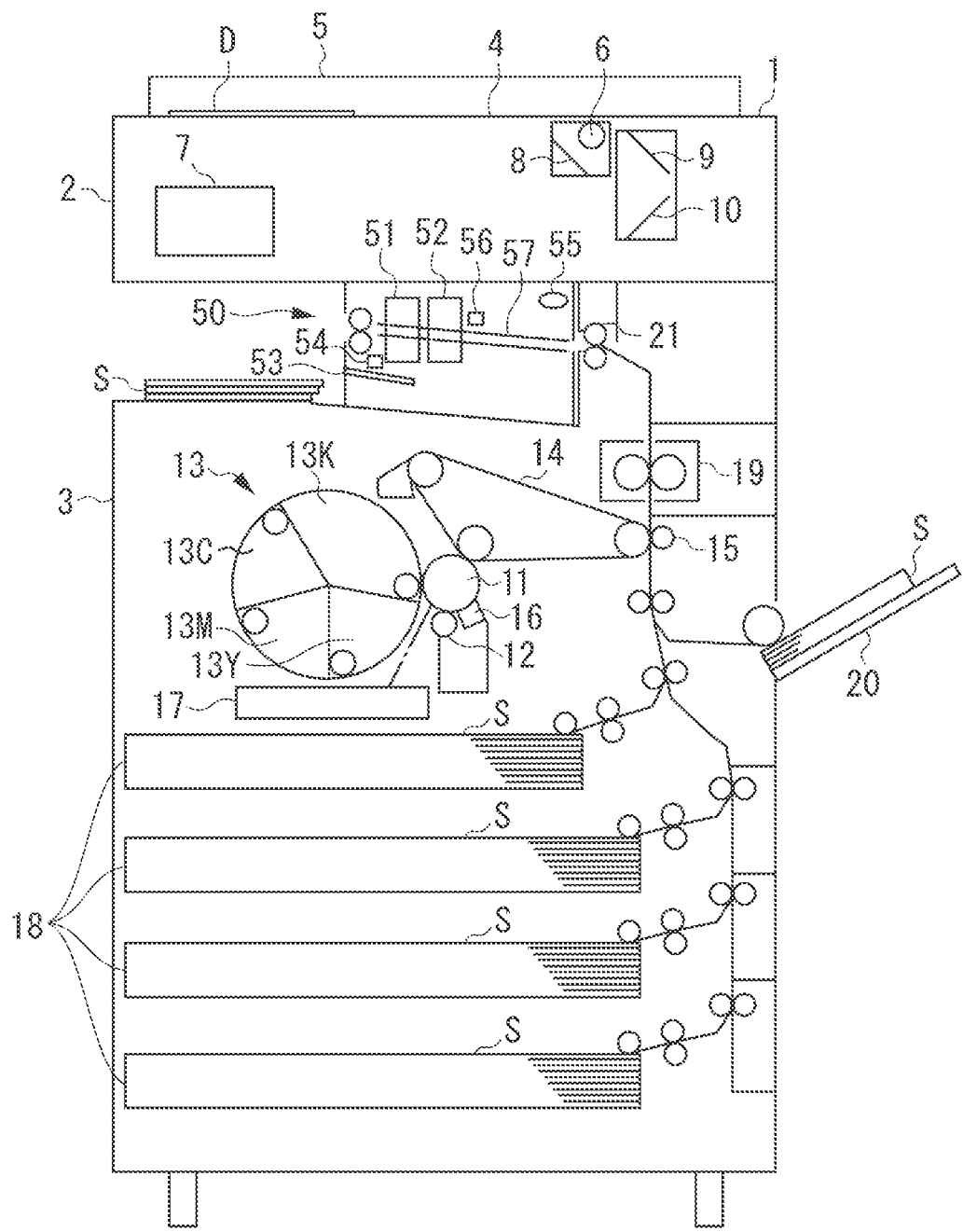
FIG. 1 is a cross sectional view illustrating a printing system according to an exemplary embodiment.

FIG. 1 is a cross sectional view illustrating an entire printing system including a sheet processing apparatus 50 according to a first exemplary embodiment and a printing apparatus 1 to which the sheet processing apparatus 50 is connected. While the sheet processing apparatus 50 and the printing apparatus 1 are described as separate apparatuses in the present exemplary embodiment, an entire apparatus including the sheet processing apparatus 50 may be referred to as a printing apparatus, or an entire apparatus including the printing apparatus 1 may be referred to as a sheet processing apparatus.

The printing apparatus 1 is roughly divided into two devices, i.e., a scanner 2 and a printer 3. The scanner 2 reads an image on an original document to generate image data. The printer 3 forms an image on a sheet. An upper part of the scanner 2 includes a platen glass 4 including a transparent glass plate. An original document D set in a predetermined position on the platen glass 4 with an image to be read facing downward is pressed and fixed by a document pressing plate 5. A lamp 6 and optical system components including reflection mirrors 8, 9, and 10 are provided under the platen glass 4. The lamp 6 applies light to the original document D, and the reflection mirrors 8, 9, and 10 guide reflection light to an image processing unit 7. The lamp 6 and the reflection mirrors 8, 9, and 10 are moved at a predetermined speed to scan the original document D.

The printer 3 includes a photosensitive drum 11, a primary charging roller 12, a rotary development unit 13, an intermediate transfer belt 14, a transfer roller 15, a cleaner 16, etc. An electrostatic latent image is formed on a surface of the photosensitive drum 11 by laser light applied by a laser unit 17 based on image data generated by reading an image on the original document D. The primary charging roller 12 uniformly charges the surface of the photosensitive drum 11 before the application of the laser light.

The rotary development unit 13 attaches magenta (M) toner, cyan (C) toner, yellow (Y) toner, and black (K) toner to the electrostatic latent image formed on the surface of the photosensitive drum 11 to form a toner image. The toner image developed on the surface of the photosensitive drum 11 is transferred onto the intermediate transfer belt 14, and the toner image transferred onto the intermediate transfer belt 14 is transferred by the transfer roller 15 onto a sheet S. The cleaner 16 removes residual toner on the photosensitive drum 11 after the transfer of the toner image.

The rotary development unit 13 employs a rotary development method, includes developing units 13K, 13Y, 13M, and 13C, and can be rotated by a motor (not illustrated). When a monochrome toner image is formed on the surface of the photosensitive drum 11, the developing unit 13K is rotated and moved to a development position near the photosensitive drum 11 to perform development. When a full-color toner image is formed, the rotary development unit 13 is rotated to position each of the developing units 13K, 13Y, 13M, and 13C in the development position and sequentially perform development for the respective colors.

The sheet S onto which the toner image on the intermediate transfer belt 14 is transferred is fed from a cassette 18 or a manual sheet-feeding tray 20 to a transfer position. A fixing unit 19 is provided on the downstream side of the transfer roller 15 in a conveying direction to fix the toner image on the conveyed sheet S. The sheet S on which the toner image is fixed is discharged by a pair of discharge rollers 21 from the printing apparatus 1 to the sheet processing apparatus 50 located on the downstream side in the conveying direction.

The sheet processing apparatus 50 is connected to a sheet discharge position of the printing apparatus 1 and is communicable with the printing apparatus 1 via a signal line (not illustrated). The sheet processing apparatus 50 communicates with the printing apparatus 1 to operate in cooperation with the printing apparatus 1. The sheet processing apparatus 50 includes staplers 51 and 52 for binding together a plurality of sheets S discharged by the pair of discharge rollers 21. The stapler 51 binds together the plurality of sheets S with a staple. On the other hand, the stapler 52 binds together the plurality of sheets S without a staple. The stapler 51 is movable as described below with reference to FIG. 3 and can execute binding processing at a plurality of positions. On the other hand, the stapler 52 is fixed in one position. Alternatively, the stapler 52 may be configured to be movable. Further, a puncher for punching a sheet, etc. may also be included in addition to the staplers.

The sheet processing apparatus 50 includes a sheet detection sensor 56 and a sheet alignment unit 57. The sheet detection sensor 56 detects the existence of the sheet S, and the sheet alignment unit 57 aligns the sheets S. The sheet processing apparatus 50 detects with the sheet detection sensor 56 the sheet S conveyed to the sheet alignment unit 57 and executes binding processing (stapling) with the stapler 51 or binding processing (stapleless binding) with the stapler 52 according to a user specification.

Further, the sheet processing apparatus 50 includes an offline stapling function to execute binding processing not on a sheet fed from the cassette 18 or the manual sheet-feeding tray 20 but on a sheet set directly on the sheet processing apparatus 50 by the user. In the case of using the offline stapling function, the binding processing with a staple by the stapler 51 is executed. A sheet insertion slit 53 is a portion (insertion portion) via which the user using the offline stapling function inserts a sheet subjected to the processing. The sheet insertion slit 53 has a form of a slit, and the user inserts a sheet into the slit. A sheet detection sensor 54 detects the insertion of the sheet in the sheet insertion slit 53.

If the sheet detection sensor 54 detects a sheet, the mode is changed to an offline mode (offline mode is turned on). At the press of an execution button 55 by the user while the offline mode is on, the stapling processing with the stapler 51 is executed. Further, even if the execution button 55 is not pressed, the stapling processing is automatically executed if the sheet detection sensor 54 continues detecting a sheet for a predetermined time.

While the offline mode is on, the printing of an image by the printing apparatus 1 is restricted so that no sheet is conveyed from the printing apparatus 1 to the sheet processing apparatus 50. Further, the execution button 55 includes a light emitting diode (LED) that can be lit and blinked, and the lighting or blinking of the LED notifies the user of the state of the sheet processing apparatus 50. The lighting of the LED indicates that the execution button 55 can be pressed (i.e., execution of sheet processing can be instructed). Further, the blinking of the LED indicates that the sheet processing will be executed soon. Besides the notification using the LED, a message may be displayed or sound may be output to notify the user of the state of the sheet processing apparatus 50.

Figure 2A:
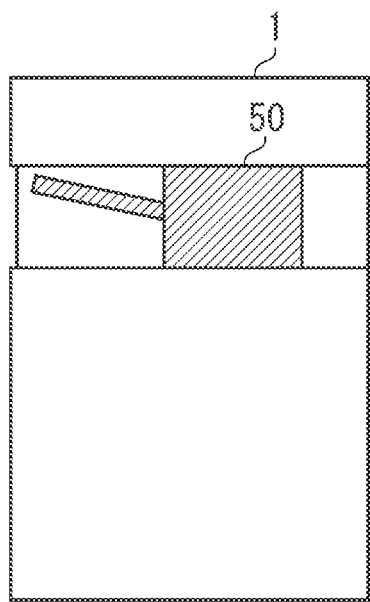
FIGS. 2A and 2B are schematic views illustrating an example of a connection between a printing apparatus and a sheet processing apparatus according to an exemplary embodiment.
Figure 2B:
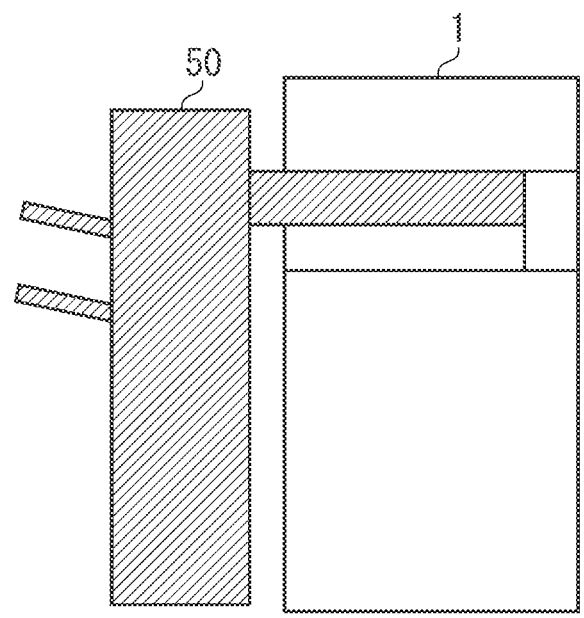

FIGS. 2A and 2B each schematically illustrate an example of a connection of the sheet processing apparatus 50 to the printing apparatus 1. FIG. 2A illustrates an example in which the sheet processing apparatus 50 is connected to the inside of the body of the printing apparatus 1. FIG. 2B illustrates an example in which the sheet processing apparatus 50 is connected to the outside of the body of the printing apparatus 1. In either one of the connection forms, the sheet processing apparatus 50 can execute stapling processing on a sheet discharged by the pair of discharge rollers 21 of the printing apparatus 1 and can also execute stapling processing on a sheet set directly on the sheet processing apparatus 50 by the user.

Figure 3:
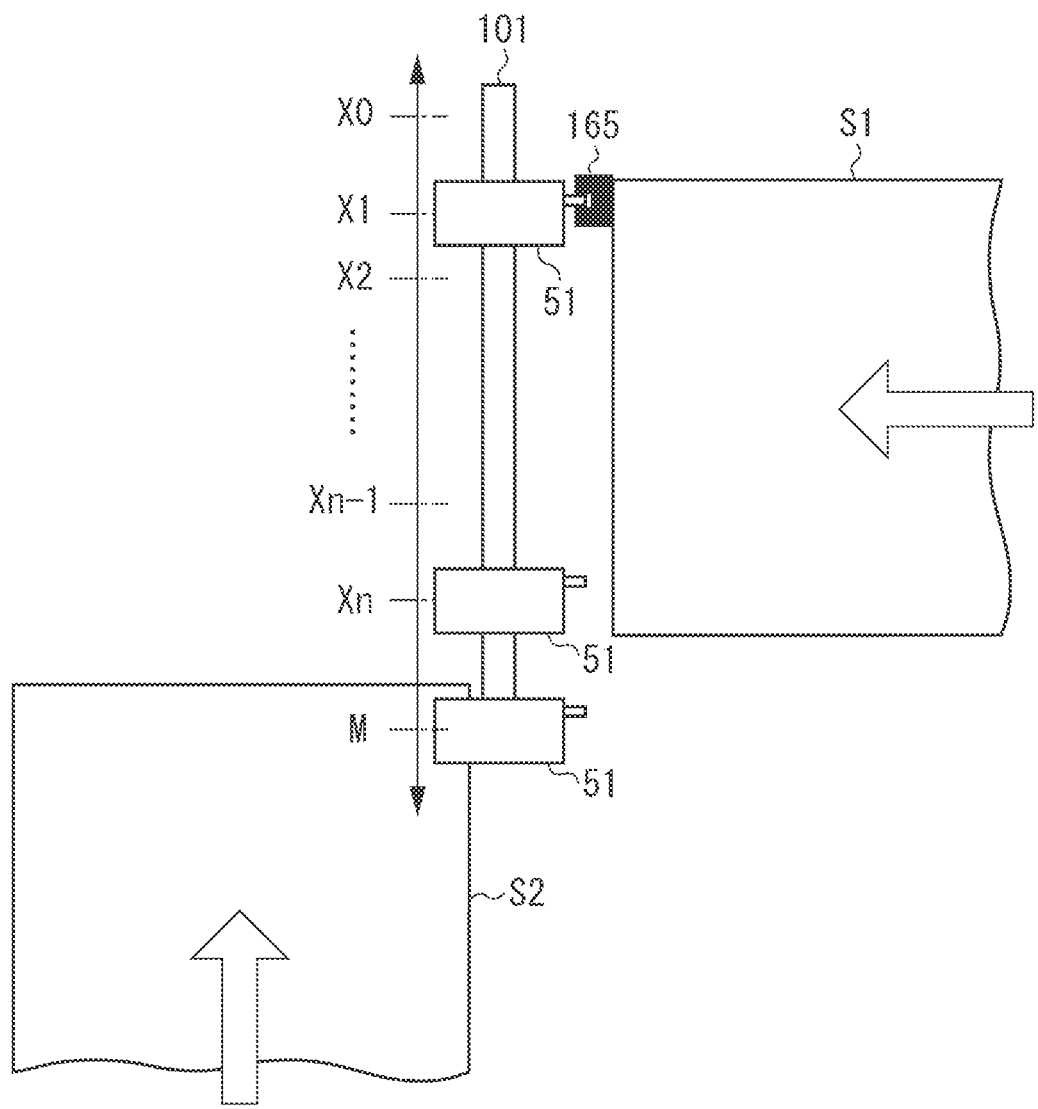
FIG. 3 illustrates a configuration of a stapler of a sheet processing apparatus according to an exemplary embodiment.

FIG. 3 illustrates a configuration of the stapler 51 of the sheet processing apparatus 50. FIG. 3 is a cross sectional view illustrating the sheet processing apparatus 50 viewed from the top. A lower side of FIG. 3 corresponds to a front surface side (front side) of the printing apparatus 1 illustrated in FIG. 1. The stapler 51 is provided to be movable in a direction of an arrow along a moving path 101. The stapler 51 has two roles. One of the roles of the stapler 51 is to perform stapling processing on a sheet S1 discharged from the printing apparatus 1. The other one of the roles of the stapler 51 is to perform stapling processing on a sheet S2 inserted in the sheet insertion slit 53.

To staple the sheet S1, stapling processing needs to be performed at a stapling position set by the user. Thus, a stapler moving motor 164 (FIG. 4) is driven to move the stapler 51 along the moving path 101 so that the stapling processing can be performed at any of positions X1, X2 . . . , Xn−1, and Xn. Although not illustrated, the stapler 51 is also configured to be movable in upward and downward directions (vertical direction).

On the other hand, to staple the sheet S2, the stapling processing needs to be performed on the sheet S2 inserted in the sheet insertion slit 53. However, the sheet insertion slit 53 is in the front surface (front side) of the sheet processing apparatus 50. Thus, when the stapling processing is to be executed on the sheet S2, the stapler 51 is moved to a position M at the front surface side (front side) of the sheet processing apparatus 50.

The stapler 51 may hinder the sheet conveyance if the stapler 51 is located on the path through which the sheet S1 is conveyed. Thus, when the stapling processing with the stapler 51 is not executed, the stapler 51 is evacuated to a position X0 where the stapler 51 is not likely to hinder the sheet conveyance.

Figure 4:
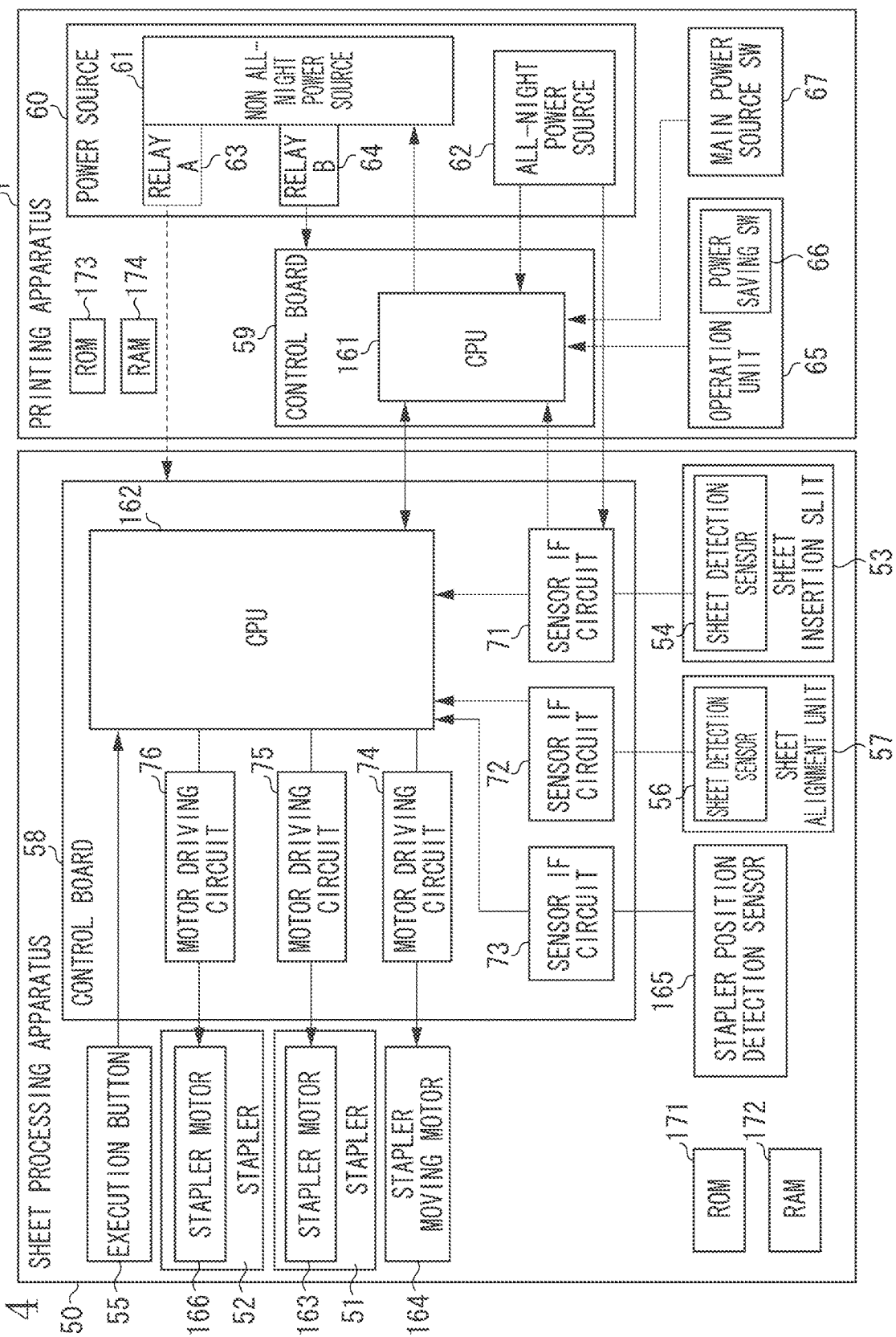
FIG. 4 is a hardware configuration diagram illustrating a control system of a printing apparatus and a sheet processing apparatus according to an exemplary embodiment.

The following describes a configuration of a control system of the printing apparatus 1 and the sheet processing apparatus 50. FIG. 4 is a hardware configuration diagram illustrating the control system of the printing apparatus 1 and the sheet processing apparatus 50. In FIG. 4, the printing apparatus 1 includes a control board 59 including a central processing unit (CPU) 161, a power source 60, and an operation unit 65. The sheet processing apparatus 50 includes a control board 58 including a CPU 162, etc., a sheet detection sensor 54, a stapler position detection sensor 165, a stapler motor 163, the stapler moving motor 164, etc.

The CPU 161 of the printing apparatus 1 controls each unit of the printing apparatus 1. Further, the CPU 161 reads a control program stored in a read-only memory (ROM) 173 to perform control relating to the sheet processing. A random access memory (RAM) 174 is used as a temporary storage area such as a main memory of the CPU 161, a work area, etc. While one CPU 161 uses one memory (RAM 173) to execute processing specified in a flow chart described below in the printing apparatus 1, any other configuration can be adopted. For example, a plurality of CPUs and a plurality of RAMs or a hard disk drive (HDD) or a solid state drive (SSD) may cooperate to execute processing. Further, a part of the processing described below may be executed by use of a hardware circuit such as an application specific integrated circuit (ASIC), etc.

In a case where insertion of a sheet in the sheet insertion slit 53 is detected while the printing apparatus 1 and the sheet processing apparatus 50 are in a power saving mode, the CPU 161 functions as follows. Specifically, the printing apparatus 1 is remained in the power saving mode, and the sheet processing apparatus 50 is recovered from the power saving mode. The power source 60 includes a non all-night power source 61, an all-night power source 62, a relay A 63, and a relay B 64. The non all-night power source 61 is connected to the control board 58 via the relay A 63 and to the control board 59 via the relay B 64. The all-night power source 62 is connected to the CPU 161 of the control board 59 and to a sensor interface (IF) circuit 71 of the control board 58.

The non all-night power source 61 is a power source capable of supplying power or stopping the supply of power according to the control by the CPU 161. The all-night power source 62 is a power source configured to constantly supply power with a power source plug of the printing apparatus 1 inserted in a power source outlet. A main power source switch (SW) 67 is a switch that is operated to turn on or off the power source of the printing apparatus 1. The operation unit 65 is a user interface (display, reception unit) for setting various types of settings with respect to the printing apparatus 1 and the sheet processing apparatus 50. The operation unit 65 includes a power saving SW 66, which is operated to change the printing apparatus 1 to the power saving mode or recover the printing apparatus 1 from the power saving mode.

The CPU 162 of the sheet processing apparatus 50 is connected to the CPU 161 of the printing apparatus 1, and the CPUs 161 and 162 communicate with each other to detect the states of the printing apparatus 1 and the sheet processing apparatus 50. Further, the CPU 162 reads a control program stored in a ROM 171 to perform control relating to the sheet processing. A RAM 172 is used as a temporary storage area such as a main memory of the CPU 162, a work area, etc. While one CPU 162 uses one memory (RAM 172) to execute processing specified in a flow chart described below in the sheet processing apparatus 50, any other configuration can be adopted. For example, a plurality of CPUs and a plurality of RAMs or a HDD or a SSD may cooperate to execute processing. Further, a part of the processing described below may be executed by use of a hardware circuit such as an ASIC, etc.

The CPU 162 of the sheet processing apparatus 50 is connected to the execution button 55, the sensor IF circuits 71, 72, and 73, and motor driving circuits 74, 75, and 76. The CPU 162 controls the respective units of the sheet processing apparatus 50 via the foregoing circuits. The CPU 162 performs control to move the stapler 51 to the position M when the sheet processing apparatus 50 is changed to the power saving mode.

The sheet detection sensor 56 detects whether there is a sheet in the sheet alignment unit 57, and transmits a notification to the CPU 162 via the sensor IF circuit 72. The sheet detection sensor 54 detects whether there is a sheet in the sheet insertion slit 53, and transmits a notification to the CPU 162 via the sensor IF circuit 71. The stapler position detection sensor 165 is located to face the moving path 101 of the stapler 51 (refer to FIG. 3) and detects the position of the stapler 51. Further, the stapler position detection sensor 165 notifies the CPU 162 of a detection result via the sensor IF circuit 73.

The stapler motor 163 is provided in the stapler 51 and driven by the motor driving circuit 75 to drive the stapler 51. In this way, stapling processing is performed on the sheet by the stapler 51. The stapler moving motor 164 is driven by the motor driving circuit 74 to move the stapler 51 to an arbitrary position as described above. The position of the stapler 51 is controlled by the CPU 162 based on a result of the detection by the stapler position detection sensor 165.

A stapler motor 166 is provided in the stapler 52 and driven by the driving circuit 76 to drive the stapler 52. In this way, stapleless binding processing is performed on the sheet by the stapler 52. At the press of the execution button 55 by the user, the execution button 55 transmits to the CPU 162 a signal corresponding to the press. Further, the lighting or blinking of the LED included in the execution button 55 is controlled by the CPU 162.

Figure 5A:
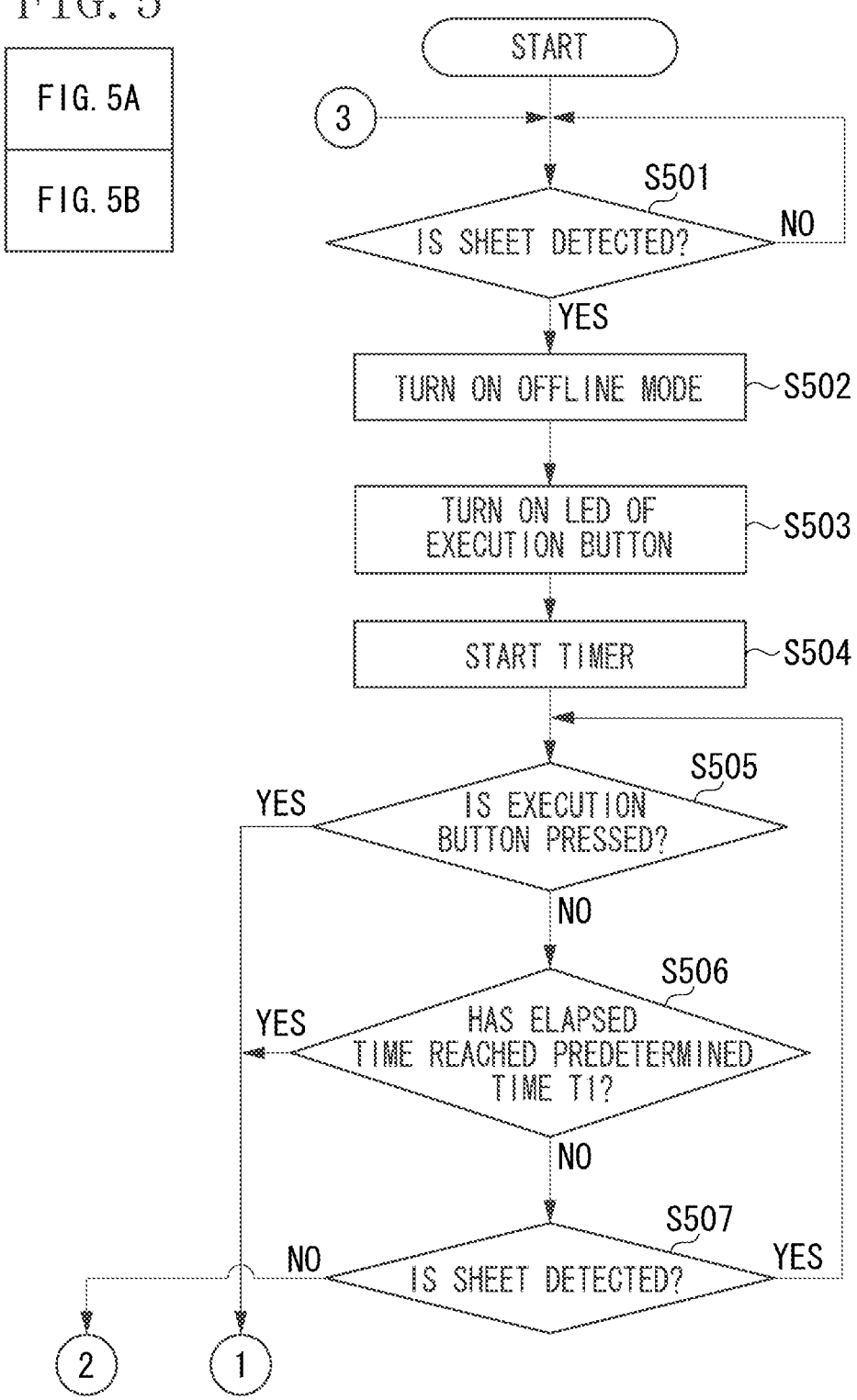
FIG. 5 (5A and 5B) is a flow chart illustrating operations of a sheet processing apparatus according to an exemplary embodiment.
Figure 5B:
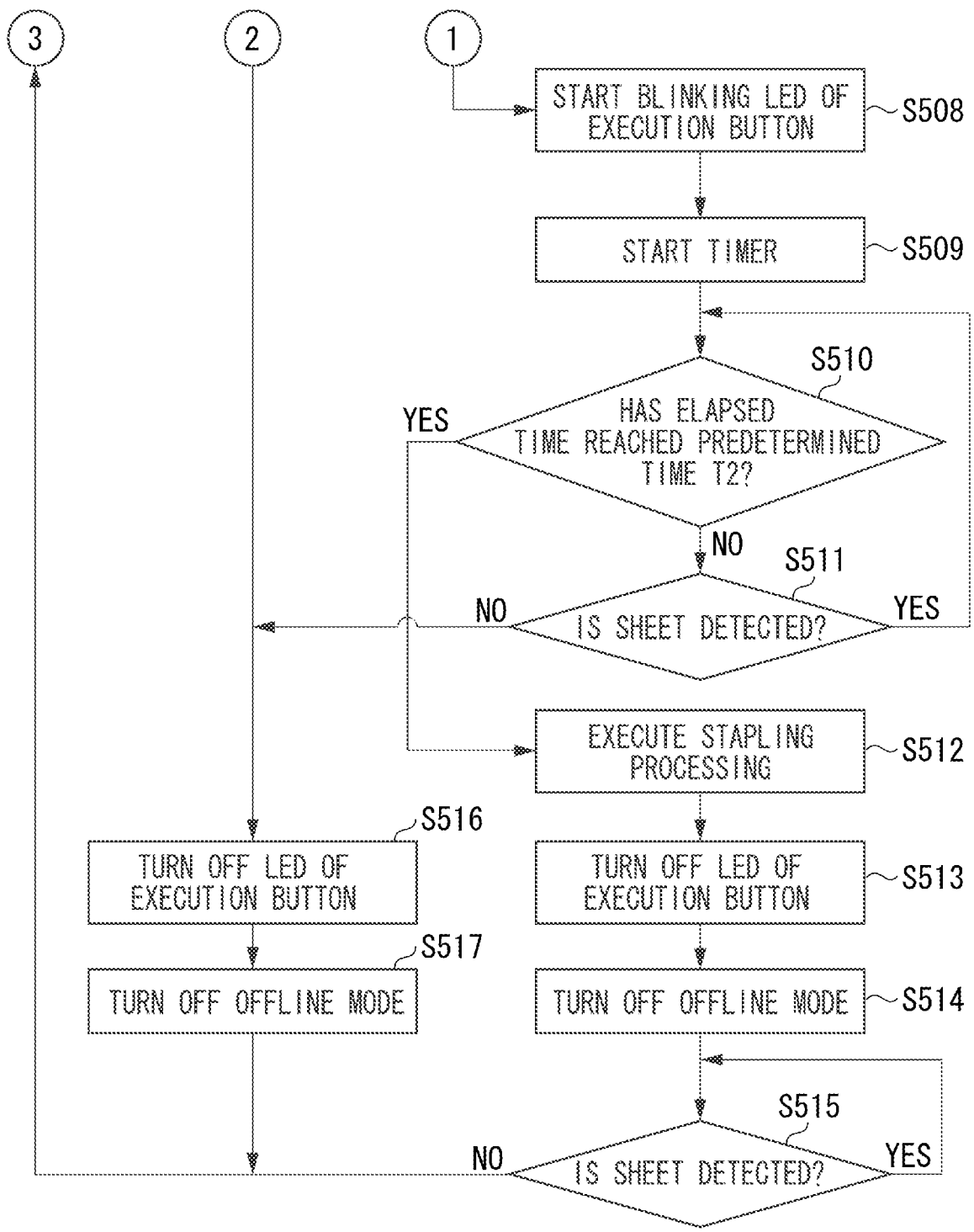

FIG. 5 (5A and 5B) is a flow chart illustrating operations of the sheet processing apparatus 50 at the time of executing stapling processing on a sheet by the offline stapling function. The CPU 162 of the sheet processing apparatus 50 executes a control program stored in the ROM 171 to realize each operation (step) specified in the flow chart of FIG. 5 (5A and 5B).

In step S501, whether a sheet is detected by the sheet detection sensor 54 is determined. If it is determined that a sheet is detected (YES in step S501), the processing proceeds to step S502. On the other hand, if it is determined that no sheet is detected (NO in step S501), the CPU 162 waits until a sheet is detected.

In step S502, the offline mode is turned on. When the offline mode is turned on, the printing of an image by the printing apparatus 1 is restricted. In step S503, the LED of the execution button 55 is turned on. By seeing the lighting of the LED of the execution button 55, the user can recognize that the execution button 55 can be pressed (an instruction to execute sheet processing can be given). Since the press of the execution button 55 is not detected until the operation in step S503 is performed, even if the execution button 55 is pressed before the operation in step S503 is performed, no stapling processing is executed. In step S504, a timer provided to the sheet processing apparatus 50 is started.

In step S505, whether the execution button 55 is pressed is determined. If it is determined that the execution button 55 is pressed (YES in step S505), the processing proceeds to step S508. On the other hand, if it is determined that the execution button 55 is not pressed (NO in step S505), the processing proceeds to step S506. In step S506, it is determined whether an elapsed time measured by the timer started in step S504 has reached a predetermined time T1. If it is determined that the elapsed time has reached the predetermined time T1 (YES in step S506), the processing proceeds to step S508. On the other hand, if it is determined that the elapsed time has not reached the predetermined time T1 (NO in step S506), the processing proceeds to step S507. While the predetermined time T1 is three seconds in the present exemplary embodiment, the predetermined time T1 may be any time period other than three seconds and may be changed and set by the user. In step S507, whether a sheet is detected by the sheet detection sensor 54 is determined. If it is determined that a sheet is detected (YES in step S507), the processing returns to step S505. On the other hand, if it is determined that no sheet is detected (NO in step S507), the processing proceeds to step S516.

In the case where the processing proceeds from step S505 to step S508, sheet processing is (manually) executed in response to a user operation. On the other hand, in the case where the processing proceeds from step S506 to step S508, sheet processing is (automatically) executed in response to an elapse of a predetermined time. A possible case where the processing proceeds from step S507 to step S516 is a case where the user sets a sheet once, but changes the user's mind not to execute stapling processing and removes the sheet, etc.

In step S508, the blinking of the LED of the execution button 55 is started. By seeing the blinking of the LED of the execution button 55, the user can recognize that the sheet processing will be executed soon. In step S509, a timer provided to the sheet processing apparatus 50 is started. This timer may be the same as or different from the timer that is started in step S504. In the case of using the same timer, processing to reset the timer is required when the processing proceeds from step S508 to step S509.

In step S510, it is determined whether an elapsed time measured by the timer started in step S509 has reached a predetermined time T2. If it is determined that the elapsed time has reached the predetermined time T2 (YES in step S510), the processing proceeds to step S512. On the other hand, if it is determined that the elapsed time has not reached the predetermined time T2 (NO in step S510), the processing proceeds to step S511. While the predetermined time T2 is one second in the present exemplary embodiment, the predetermined time T2 may be any time period other than one second and may be changed and set by the user.

In step S511, whether a sheet is detected by the sheet detection sensor 54 is determined. If it is determined that a sheet is detected (YES in step S511), the processing returns to step S510. On the other hand, if it is determined that no sheet is detected (NO in step S511), the processing proceeds to step S516. A possible case where the processing proceeds from step S511 to step S516 is a case where the predetermined time T1 has elapsed since the sheet was set by the user or a case where the user presses the execution button 55 once, but changes the user's mind not to execute stapling processing and removes the sheet, etc.

In step S512, the CPU 162 causes the stapler 51 to execute stapling processing on a plurality of sheets set in the sheet processing apparatus 50 (a plurality of sheets inserted in the sheet insertion slit 53). In step S513, the LED of the execution button 55 is turned off. In step S514, the offline mode is turned off to cancel the printing restriction. In other words, the printing restriction is cancelled in response to the completion of the stapling processing in the offline mode.

In step S515, whether a sheet is detected by the sheet detection sensor 54 is determined. If it is determined that no sheet is detected (NO in step S515), the processing returns to step S501. On the other hand, if it is determined that a sheet is detected (YES in step S515), the CPU 162 waits until the sheet detection sensor 54 no longer detects a sheet. The condition that the sheet detection sensor 54 no longer detects a sheet is set as a condition for returning to step S501 so that re-execution of the stapling processing at the same position on the same sheet is prevented in a case where the sheet is still set even after the stapling processing is executed. In step S516, the LED of the execution button 55 is turned off. In step S517, the offline mode is turned off to cancel the printing restriction, and then the processing returns to step S501.

FIG. 6 is a flow chart illustrating operations of the printing apparatus 1 at the time of receiving a job execution instruction. The CPU 161 of the printing apparatus 1 executes a control program stored in the ROM 173 to realize each operation (step) specified in the flow chart of FIG. 6.

In step S601, whether the offline mode of the sheet processing apparatus 50 is on is determined. This determination is performed by performing inquiry from the printing apparatus 1 to the sheet processing apparatus 50. If it is determined that the offline mode is on (YES in step S601), the processing proceeds to step S602. On the other hand, if it is determined that the offline mode is not on (NO in step S601), the processing proceeds to step S603. In step S602, a message indicating that the offline mode is on is displayed.

Figure 7:
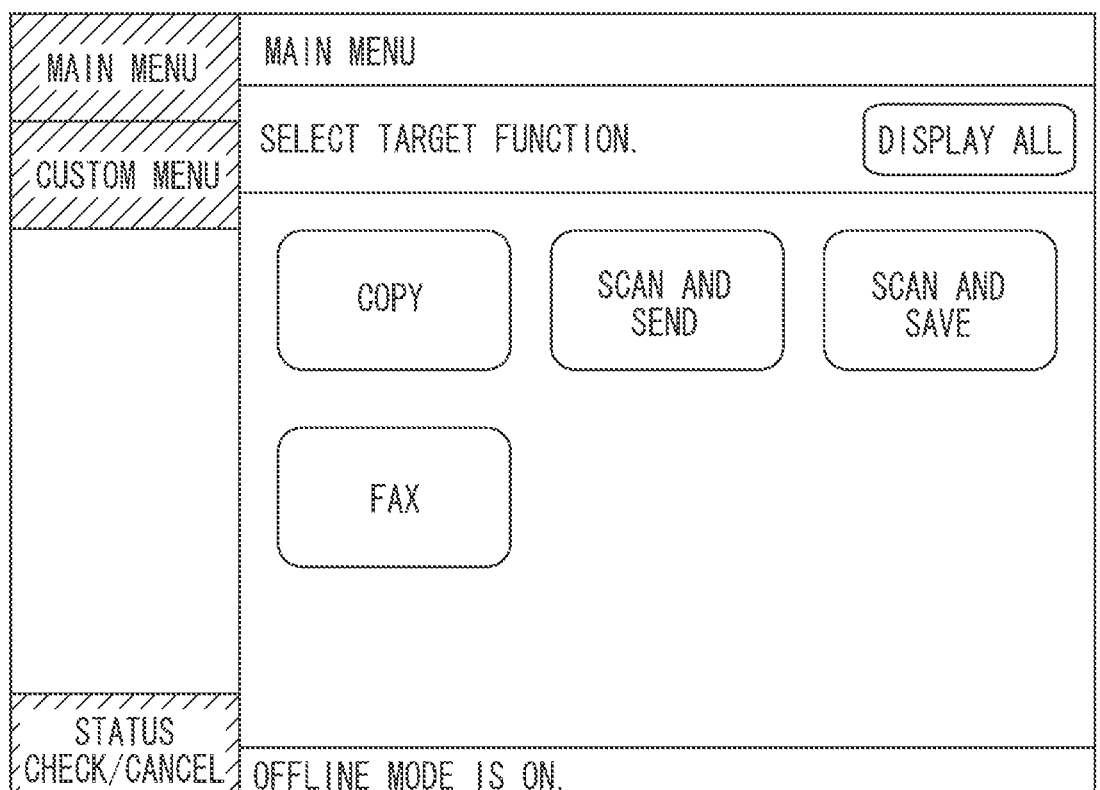
FIG. 7 illustrates an example of an operation screen displayed on a printing apparatus according to an exemplary embodiment.

FIG. 7 illustrates an example of a main menu screen which is an operation screen displayed on the operation unit 65 of the printing apparatus 1 and on which a list of the plurality of functions of the printing apparatus 1 is displayed. In step 602, the message "Offline mode is on" is displayed on a lower part of the main menu screen. By seeing the message, the user can recognize that the printing is currently restricted. The contents of the message are not limited to that illustrated in FIG. 7 and may be, for example, "Printing is restricted," or "Stapling is being executed in the finisher."

In step S603, a main menu screen that does not include the message "Offline mode is on" is displayed. In the case where the processing proceeds to step S603 with the message "Offline mode is on" being displayed, the message is hidden in step S603.

In step S604, whether a job execution instruction is received is determined. The user can give a job execution instruction by pressing a start button included in the operation unit 65 of the printing apparatus 1. If it is determined that a job execution instruction is received (YES in step S604), the processing proceeds to step S605. On the other hand, if it is determined that no job execution instruction is received (NO in step S604), the processing returns to step S601.

In step S605, as in step S601, whether the offline mode of the sheet processing apparatus 50 is on is determined. If it is determined that the offline mode is not on (NO in step S605), the processing proceeds to step S606. On the other hand, if it is determined that the offline mode is on (YES in step S605), the CPU 161 waits until the offline mode becomes off. The CPU 161 waits in order to restrict the printing while the offline mode is on. In step S606, the job, the execution instruction of which has been received, is executed. More specifically, in a case where the job is a print job, an image is printed on a sheet.

As described above, in the first exemplary embodiment, the printing of an image by the printing apparatus 1 is restricted in response to detection of a sheet by the sheet detection sensor 54 on which stapling processing is performed by the stapler 51 not in association with the printing of an image by the printing apparatus 1. In this way, the printing of an image can be restricted without requiring the user to perform a complicated operation in the case where the sheet processing is to be performed not in association with the printing of an image.

A second exemplary embodiment will be described below. In the first exemplary embodiment, the example is described in which execution of all jobs by the printing apparatus 1 is uniformly restricted in response to detection of a sheet by the sheet detection sensor 54. On the contrary, in the present exemplary embodiment, an example will be described in which whether to restrict execution of a job is switched according to the type of the job. Further, in the present exemplary embodiment, an example will be described in which a job is not restricted in a case where the job is already being executed by the printing apparatus 1 when a sheet is detected by the sheet detection sensor 54. Only the points that are different from those in the first exemplary embodiment will be described, and other points are similar to those in the first exemplary embodiment.

Figure 8B:
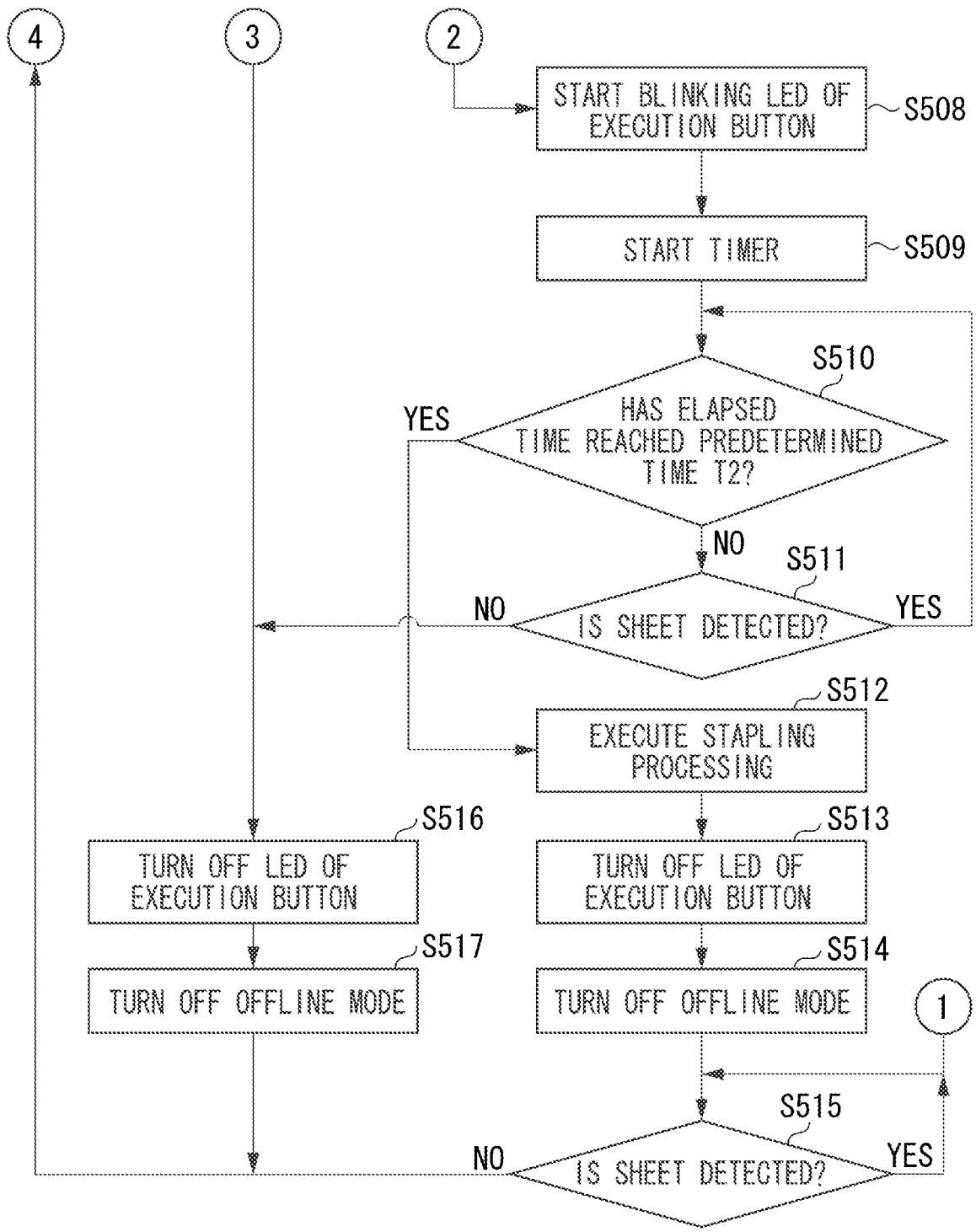
FIG. 8 (8A and 8B) is a flow chart illustrating operations of a sheet processing apparatus according to an exemplary embodiment.

FIG. 8 (8A and 8B) is a flow chart illustrating operations of the sheet processing apparatus 50 at the time of performing stapling processing on a sheet by the offline stapling function. FIG. 8 (8A and 8B) corresponds to the flow chart in FIG. 5 (5A and 5B) described in the first exemplary embodiment. The flow chart in FIG. 8 (8A and 8B) is different from the flow chart in FIG. 5 (5A and 5B) in that steps S801 and S802 are added.

In step S501, whether a sheet is detected by the sheet detection sensor 54 is determined. If it is determined that a sheet is detected (YES in step S501), the processing proceeds to step S801. On the other hand, if it is determined that no sheet is detected (NO in step S501), the CPU 162 waits until a sheet is detected.

In step S801, whether the printing apparatus 1 is executing a job is determined. If it is determined that the printing apparatus 1 is executing a job (YES in step S801), the processing proceeds to step S802. On the other hand, if it is determined that the printing apparatus 1 is not executing a job (NO in step S801), the processing proceeds to step S502. In step S802, whether the job being executed is a print job is determined. If it is determined that the job being executed is a print job (YES in step S802), the processing proceeds to step S515. On the other hand if it is determined that the job being executed is not a print job (NO in step S802), the processing proceeds to step S502.

In the case where the processing proceeds from step S801 or S802 to step S502, the offline stapling function can be used, and thus steps S502 to S517 described above with reference to the flow chart of FIG. 5 (5A and 5B) are executed. On the other hand, in the case where the processing proceeds from step S802 to step S515, the offline stapling function cannot be used, so the offline mode is not turned on (i.e., restriction of the printing is not performed). Examples of a job other than a print job include a job of scanning a document and sending image data, a job of scanning a document and saving image data, etc. These jobs do not use the sheet processing apparatus 50, so even if any one of these jobs is being executed, the offline stapling function can be used.

Since the processing is to proceed not to step S501 but to step S515 in the case where it is determined that the job is a print job, step S502 and the subsequent steps are not performed even if the execution of the print job is completed with the sheet inserted in the sheet insertion slit 53. In order to execute step S502 and the subsequent steps, the sheet remaining inserted in the sheet insertion slit 53 needs to be removed and then inserted again. This arrangement is made because it is difficult for the user to predict the exact timing of the completion of the execution of the print job and if stapling processing is unexpectedly executed, an error such as pushing of a staple into an unintended position may occur.

Figure 9:
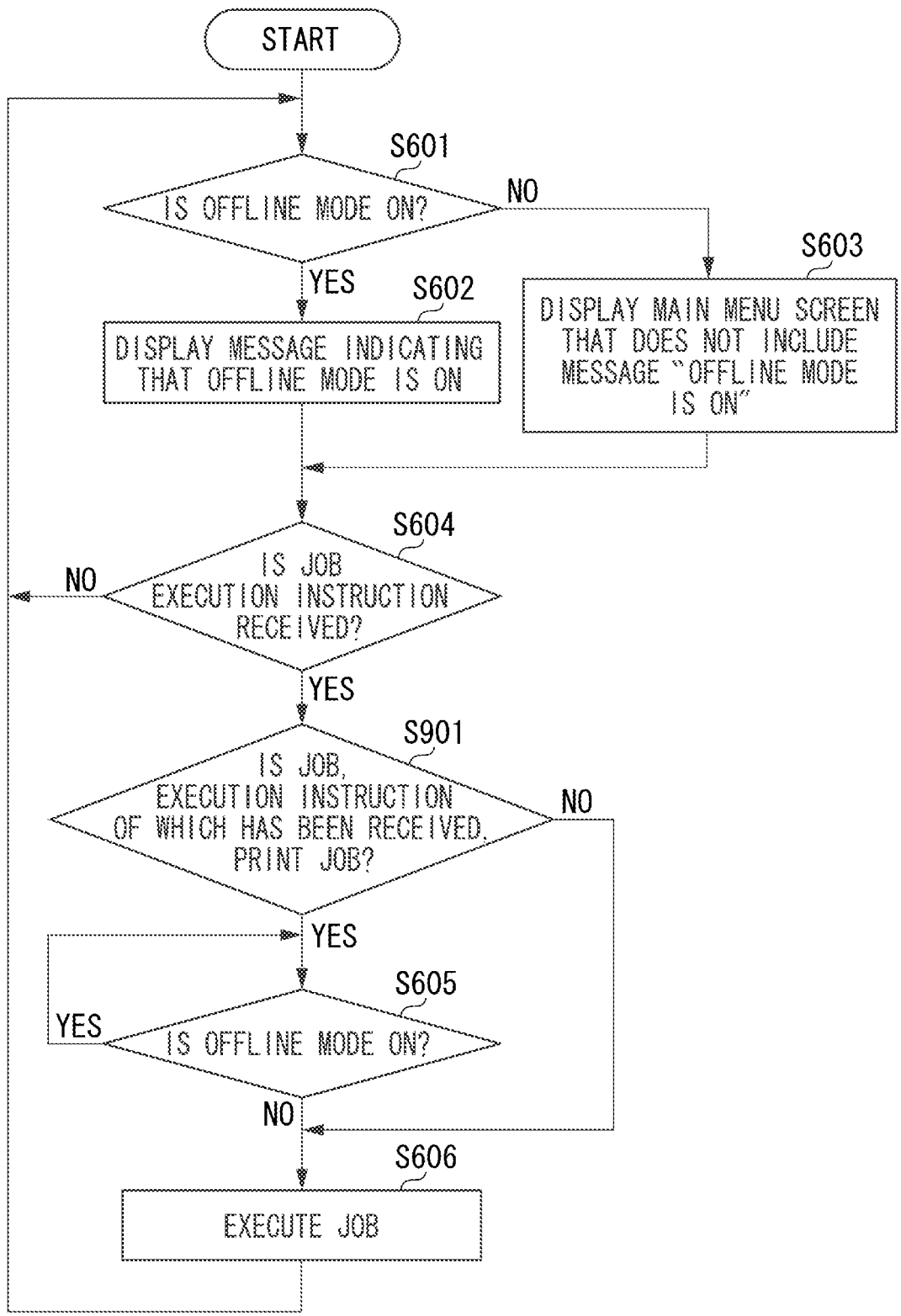
FIG. 9 is a flow chart illustrating operations of a printing apparatus according to an exemplary embodiment.

FIG. 9 is a flow chart illustrating operations of the printing apparatus 1 at the time of receiving a job execution instruction. FIG. 9 corresponds to the flow chart in FIG. 6 described in the first exemplary embodiment. The flow chart in FIG. 9 is different from the flow chart in FIG. 6 in that step S901 is added.

In step S604, whether a job execution instruction is received is determined. The user can give a job execution instruction by pressing the start button included in the operation unit 65 of the printing apparatus 1. If it is determined that a job execution instruction is received (YES in step S604), the processing proceeds to step S901. On the other hand, if it is determined that no job execution instruction is received (NO in step S604), the processing returns to step S601.

In step S901, whether the job, the execution instruction of which has been received, is a print job is determined. If it is determined that the job is a print job (YES in step S901), the processing proceeds to step S605. On the other hand, if it is determined that the job is not a print job (NO in step S901), the processing proceeds to step S606.

Examples of jobs other than a print job include a job of scanning a document and sending image data, a job of scanning a document and saving image data, etc. The processing is to proceed from step S801 to step S606 because these jobs do not use the sheet processing apparatus 50, so even if the offline mode of the sheet processing apparatus 50 is on, it is not necessary to wait until the offline mode becomes off. Even in the case where the job is a print job, processing up to print data processing (raster image processor (RIP) processing and image processing) may be performed, and only the processing to print an image on a sheet may be restricted.

As the foregoing describes, in the second exemplary embodiment, in the case of using the offline stapling function, whether to restrict the execution of a job to be executed by the printing apparatus 1 is switched according to the type of the job. Further, a job is not restricted in the case where the job (print job) is already being executed by the printing apparatus 1 when a sheet is detected by the sheet detection sensor 54.

While only the stapling processing by the stapler 51 with the use of a staple is described as a target of the offline stapling function in the first and second exemplary embodiments, an exemplary embodiment of the present invention is also applicable to stapleless binding processing by the stapler 52 without the use of a staple. Further, an exemplary embodiment of the present invention is also applicable to punching processing by a puncher (not illustrated).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A printing system comprising:
   a printing apparatus configured to print an image on a sheet;
   a sheet processing apparatus including:
      a slit into which an insert sheet is inserted by a user,
      a stapler configured to staple the sheet conveyed from the printing apparatus and staple the insert sheet inserted into the slit,
      a sensor configured to detect the insert sheet inserted into the slit, and
      a light emitter; and
   a controller configured to:
      cause the light emitter to blink based on a detection of the insert sheet by the sensor,
      cause the stapler to staple the insert sheet when an elapsed time elapsed from the detection of the insert sheet by the sensor has reached a predetermined time, and
      cause the light emitter being blinking to turn off when the stapler staples the insert sheet.

2. The printing system according to claim 1, wherein the slit is provided on a front side of the sheet processing apparatus.

3. The printing system according to claim 1,
   wherein the sensor detects the insertion sheet inserted into the slit and being positioned at a predetermined position, and
   wherein the stapler staples the insertion sheet detected by the sensor and being at the predetermined position.

4. The printing system according to claim 1, wherein after the stapler staples the insertion sheet, the light emitter is turned off at least until the insertion sheet is not detected by the sensor.

5. The printing system according to claim 1, wherein the stapler is configured to staple the sheet conveyed from the printing apparatus at a first stapling position and staple the insert sheet at a second stapling position that is different from the first stapling position in a width direction perpendicular to a sheet conveyance direction of the sheet conveyed from the printing apparatus.

6. The printing system according to claim 1, wherein the controller causes the light emitter to become from a state that the light emitter emits light continuously to a state that the light emitter blinks, based on the detection of the insert sheet by the sensor.

7. A printing system comprising:
a printing apparatus configured to print an image on a sheet;
a sheet processing apparatus including:
a slit into which an insert sheet is inserted by a user,
a stapler configured to staple the sheet conveyed from the printing apparatus and staple the insert sheet inserted into the slit,
a sensor configured to detect the insert sheet inserted into the slit, and
a light emitter; and
a controller configured to control the light emitter,
wherein the controller causes the stapler to staple the insert sheet inserted into the slit when an elapsed time elapsed from the detection of the insert sheet by the sensor has reached a predetermined time,
wherein, before the stapler staples the insert sheet detected by the sensor, the controller causes the light emitter to become a first state that the light emitter blinks, based on a detection of the insert sheet by the sensor, and
wherein the light emitter is in a second state that the light emitter is turned off at a time point after the stapler staples the insert sheet.

8. The printing system according to claim 7, wherein the light emitter changes from a third state that the light emitter emits light continuously to the first state.

9. The printing system according to claim 7, wherein the slit is provided on a front side of the sheet processing apparatus.

10. The printing system according to claim 7, wherein after the stapler staples the insertion sheet, the light emitter is kept in the second state at least until the insertion sheet is not detected by the sensor.

11. The printing system according to claim 7, wherein the stapler is configured to staple the sheet conveyed from the printing apparatus at a first stapling position and staple the insert sheet at a second stapling position that is different from the first stapling position in a width direction perpendicular to a sheet conveyance direction of the sheet conveyed from the printing apparatus.

12. The printing system according to claim 7, wherein the controller causes the light emitter being blinking to turn off while the insert sheet is inserted into the slit.

13. A sheet processing apparatus, connected to a printing apparatus configured to print an image on a sheet, comprising:
a slit into which an insert sheet is inserted by a user;
a stapler configured to staple the sheet conveyed from the printing apparatus and staple the insert sheet inserted into the slit;
a sensor configured to detect the insert sheet inserted into the slit;
a light emitter; and
a controller configured to control the light emitter,
wherein the controller causes the stapler to staple the insert sheet inserted into the slit when an elapsed time elapsed from the detection of the insert sheet by the sensor has reached a predetermined time,
wherein, before the stapler staples the insert sheet detected by the sensor, the controller causes the light emitter to become a first state that the light emitter blinks, based on a detection of the insert sheet by the sensor, and
wherein the light emitter is in a second state that the light emitter is turned off at a time point after the stapler staples the insert sheet.

* * * * *